United States Patent
Vuichard et al.

(10) Patent No.: US 10,288,179 B2
(45) Date of Patent: May 14, 2019

(54) BALL VALVE APPARATUS

(71) Applicant: JOHNSON ELECTRIC INTERNATIONAL AG, Murten (CH)

(72) Inventors: Emmanuel Vuichard, Epagny (CH); Yvan Bourqui, Corminboeuf (CH)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 15/586,887

(22) Filed: May 4, 2017

(65) Prior Publication Data

US 2017/0321815 A1 Nov. 9, 2017

(30) Foreign Application Priority Data

May 4, 2016 (GB) .................................. 1607768.7

(51) Int. Cl.
*F16K 11/087* (2006.01)
*F16K 5/06* (2006.01)
(Continued)

(52) U.S. Cl.
CPC ........ *F16K 11/0873* (2013.01); *F16K 5/0605* (2013.01); *F16K 5/0647* (2013.01); *F16K 27/067* (2013.01); *F16K 31/043* (2013.01); *F16K 31/602* (2013.01); *F16K 37/0041* (2013.01); *F16K 47/045* (2013.01); *Y10T 137/86751* (2015.04)

(58) Field of Classification Search
USPC .................................................. 137/625.32
See application file for complete search history.

(56) References Cited

U.S. PATENT DOCUMENTS

| | | | |
|---|---|---|---|
| 4,540,025 A | * | 9/1985 | Ledeen ................. F16K 47/045 137/625.32 |
| 4,890,817 A | * | 1/1990 | Uri ........................ F16K 27/065 137/327 |

(Continued)

FOREIGN PATENT DOCUMENTS

DE 19940471 * 3/2001 ............... F16K 5/06

*Primary Examiner* — John Fox
(74) *Attorney, Agent, or Firm* — Muncy, Geissler, Olds & Lowe, P.C.

(57) ABSTRACT

A ball valve apparatus with an improved linearity of fluid flow therethrough is provided. The ball valve includes a valve housing including a housing inlet and a housing outlet; a valve ball receivable within the valve housing, the valve ball having a bore therethrough, a ball inlet and ball outlet of the valve ball which are in fluid communication with the bore, a fluid flow path through the ball valve apparatus being defined at least in part by the housing inlet, housing outlet, ball inlet, ball outlet and the bore. There is also provided a valve stem engagable with the valve ball and. To control the fluid flow through the apparatus such that there is a linear or substantially linear relationship between at the angular position of the valve ball and the fluid flow through the apparatus, there may be provided at least one bridging element, positioned on the fluid flow path to alter a fluid flow thereacross and/or ball outlet, and/or at least one of the ball inlet and ball outlet may have a non-circular profile. A ball valve for such an apparatus is also provided, in addition to method of improving the linearity of fluid flow through a ball valve apparatus.

14 Claims, 4 Drawing Sheets

(51) Int. Cl.
*F16K 27/06* (2006.01)
*F16K 31/04* (2006.01)
*F16K 31/60* (2006.01)
*F16K 37/00* (2006.01)
*F16K 47/04* (2006.01)

(56) References Cited

U.S. PATENT DOCUMENTS

| | | | | |
|---|---|---|---|---|
| 5,251,663 A | * | 10/1993 | Christianson | F16K 11/0853 137/625.47 |
| 6,874,759 B2 | * | 4/2005 | Aoshima | F16K 5/04 251/309 |
| 7,347,408 B2 | * | 3/2008 | Keiser | F16K 5/0605 251/171 |
| 8,100,144 B2 | * | 1/2012 | Dirker | F01L 1/022 137/625.32 |
| 8,794,264 B2 | * | 8/2014 | Bartnick | F16J 15/062 137/625.28 |
| 9,903,481 B2 | * | 2/2018 | Keller | F16K 5/0605 |

\* cited by examiner

BALL VALVE APPARATUS

CROSS-REFERENCE TO RELATED APPLICATIONS

This non-provisional patent application claims priority under 35 U.S.C. § 119(a) from Patent Application No. 1607768.7 filed in United Kingdom on 4 May 2016.

FIELD OF THE INVENTION

The present invention relates to a ball valve apparatus for controlling the flow of a fluid through a system, and furthermore to a specific valve ball for use with such an apparatus. A method of improving the linearity of fluid flow through a ball valve apparatus is also provided.

BACKGROUND OF THE INVENTION

Valves are used to control a flow of fluid through a fluid flow apparatus, and the simplest valves are simple on-off valves which either permit or prevent fluid flow through the valve. However, more sophisticated control valves are available which are able to regulate the fluid flow through the valve in a non-binary manner.

Ball valves are simple control valves; a two-way ball valve typically comprises a ball having a cylindrical bore therethrough. The valve ball can be rotated via a valve stem, which twists the bore out of alignment with an inlet and outlet of the valve. This chokes the flow through the ball valve, and therefore a flow out of the outlet of the valve can be controlled.

Unfortunately, the nature of the rotation of the valve ball is such that the overlap between the bore and the inlet and outlet is non-linear with respect to the degree of rotation of the valve stein. As such, precise control of the flow through a ball valve is not possible without downstream measurement of the flow.

SUMMARY OF THE INVENTION

According to a first aspect of the invention, there is provided a ball valve apparatus having an improved linearity of fluid flow therethrough, the ball valve apparatus comprising: a valve housing including a housing inlet and a housing outlet; a valve ball, receivable within the valve housing, the valve ball having a bore therethrough; a ball inlet and ball outlet of the valve ball which are in fluid communication with the bore, a fluid flow path through the ball valve apparatus being defined at least in part by the housing inlet, housing outlet, ball inlet, ball outlet and the bore; a valve stem engagable with the valve ball; and at least one bridging element positioned on the fluid flow path to alter a fluid flow thereacross; the valve ball being rotatable relative to the valve housing via the valve stem such that as the ball inlet and housing inlet, and ball outlet and housing outlet are brought in and out of alignment, due to the bridging element a flow rate along the fluid flow path changes linearly or substantially linearly with a degree of rotation of the valve ball.

By providing a valve ball having apertures in which the bridging element at least in part blocks the fluid flow through one or more apertures, the rate of fluid flow through the valve ball can be altered. The shape of the bridging element may be carefully selected to increase a linearity in the relationship between the angular position of the valve ball and the fluid flow through the apparatus, advantageously increasing the accuracy with which fluid flow through the apparatus can be controlled.

Preferably, the at least one bridging element may be associated with the ball inlet and/or ball outlet, in which case one said bridging element may be provided associated with each of the ball inlet and ball outlet of the valve ball. The or each bridging element may span a width of the ball inlet and/or ball outlet so as to segment the ball inlet and/or ball outlet, in which case, the or each bridging element may be aligned in a plane which is perpendicular to an axis of rotation of the valve ball.

The positioning of the bridging element may be chosen so as to best improve the linearization effect created. A horizontal bridging element which spans each aperture allows for customisation of the aperture dimensions in region in which it would be otherwise difficult to manufacture a flow interruption element.

The or each bridging element may include an elongate bridge body and a baffle element which extends laterally of the bridge body within the ball inlet and/or ball outlet. Optionally, the baffle element may be symmetric about the bridge body. A plurality of said baffle elements may be provided in a spaced apart relationship along the bridge body.

Baffle elements, engaged with the bridging element, advantageously allow for further customization of the internal dimensioning of the aperture, further improving the linearization effect.

At least one of the ball inlet and ball outlet may have a non-circular profile, which may be a substantially asymmetric, arched, chevron or D-shaped profile.

According to a second aspect of the invention, there is provided a ball valve apparatus having an improved linearity of fluid flow therethrough, the ball valve apparatus comprising: a valve housing including a housing inlet and a housing outlet; a valve ball having a bore therethrough, a ball inlet and ball outlet of the valve ball which are in fluid communication with the bore, a fluid flow path through the ball valve apparatus being defined at least in part by the housing inlet, housing outlet, ball inlet, ball outlet and the bore, and at least one of the ball inlet and ball outlet having a non-circular profile; a valve stem engagable with the valve ball; and the valve ball being rotatable relative to the valve housing such that as the ball inlet and housing inlet, and ball outlet and housing outlet are brought in and out of alignment, due to the bridging element a flow rate along the fluid flow path changes linearly or substantially linearly with a degree of rotation of the valve ball.

By shaping the apertures so as to have non-circular profiles, it becomes possible to overcome some of the geometric difficulties associated with valve balls having circular openings; ordinarily, the circular profile leads to choked flow when first opening the valve, and subsequently increased flow further through the rotation of the valve ball.

Preferably, the ball valve apparatus may further comprise at least one bridging element associated with the ball inlet and/or ball outlet to alter a fluid flow through the ball inlet and/or ball outlet. At least one of the ball inlet and ball outlet may have a substantially asymmetric, arched, chevron or D-shaped profile.

The ball inlet and ball outlet may, in one embodiment, be shaped differently to one another.

By forming the inlet and ball outlets so as to be different to one another, the flow through the inlet, for instance, can remain constant, whilst the flow through the or each ball outlet can be adjusted by rotation of the valve ball.

There may be provided a ball valve apparatus in which the valve ball includes two said ball inlets or two said ball outlets, and the valve housing respectively includes two said housing inlets or two said housing outlets, to form a three-way ball valve apparatus.

A three-way ball valve apparatus is able to act as a fluid flow-splitter or flow-merger, whilst still maintaining all of the advantages relating to the linearity of the relationship between rotation and flow through the apparatus.

Preferably, the ball valve apparatus may include a valve actuator engagable with the valve ball to effect the rotation of the valve ball.

The provision of a dedicated actuator which is able to control the actuation of the valve ball beneficially provides a more accurate mechanism by which the fluid flow through the apparatus can be controlled, without relying on manual control, which can be imprecise.

According to a third aspect of the invention, there is provided a valve ball for use as part of a ball valve apparatus, preferably in accordance with the first and/or second aspects of the invention, having an improved linearity of fluid flow therethrough, the valve ball comprising a ball body having a bore therethrough, a ball inlet and ball outlet of the valve ball which are in fluid communication with the bore, a fluid flow path through the valve ball being defined at least in part by the ball inlet, ball outlet and the bore; and at least one bridging element positioned on the fluid flow path to alter a fluid flow thereacross, so that as the in use valve ball rotates relative to a valve housing, due to the bridging element, a flow rate along the fluid flow path changes linearly or substantially linearly with a degree of rotation of the valve ball.

At least one of the ball inlet and ball outlet may have a non-circular profile.

According to a fourth aspect of the invention, there is provided a valve ball for use as part of a ball valve apparatus, preferably in accordance with the first and/or second aspects of the invention, having an improved linearity of fluid flow therethrough, the valve ball comprising a ball body having a bore therethrough, a ball inlet and ball outlet of the valve ball which are in fluid communication with the bore, a fluid flow path through the ball valve apparatus being defined at least in part by the ball inlet, ball outlet and the bore, at least one of the ball inlet and ball outlet having a non-circular profile.

At least one bridging element may be associated with the ball inlet and/or ball outlet to alter a fluid flow through the ball inlet and/or ball outlet.

According to a fifth aspect of the invention, there is provided a method of improving the linearity of fluid flow through a ball valve apparatus, the method comprising the steps of: a] providing a ball valve apparatus preferably in accordance with the first and/or second aspects of the invention; and b] rotating the valve ball to increase a fluid flow across the fluid flow path, such that due to the bridging element the change in fluid flow is linearly or substantially linearly proportional to the degree of rotation of the valve ball.

BRIEF DESCRIPTION OF THE DRAWINGS

FIG. 2b shows a cross-sectional plan view through the ball valve apparatus of FIG. 2a;

Below, embodiments of the present invention will be described in detail with reference to the accompanying drawings.

DETAILED DESCRIPTION OF THE PREFERRED EMBODIMENTS

Figure 1:
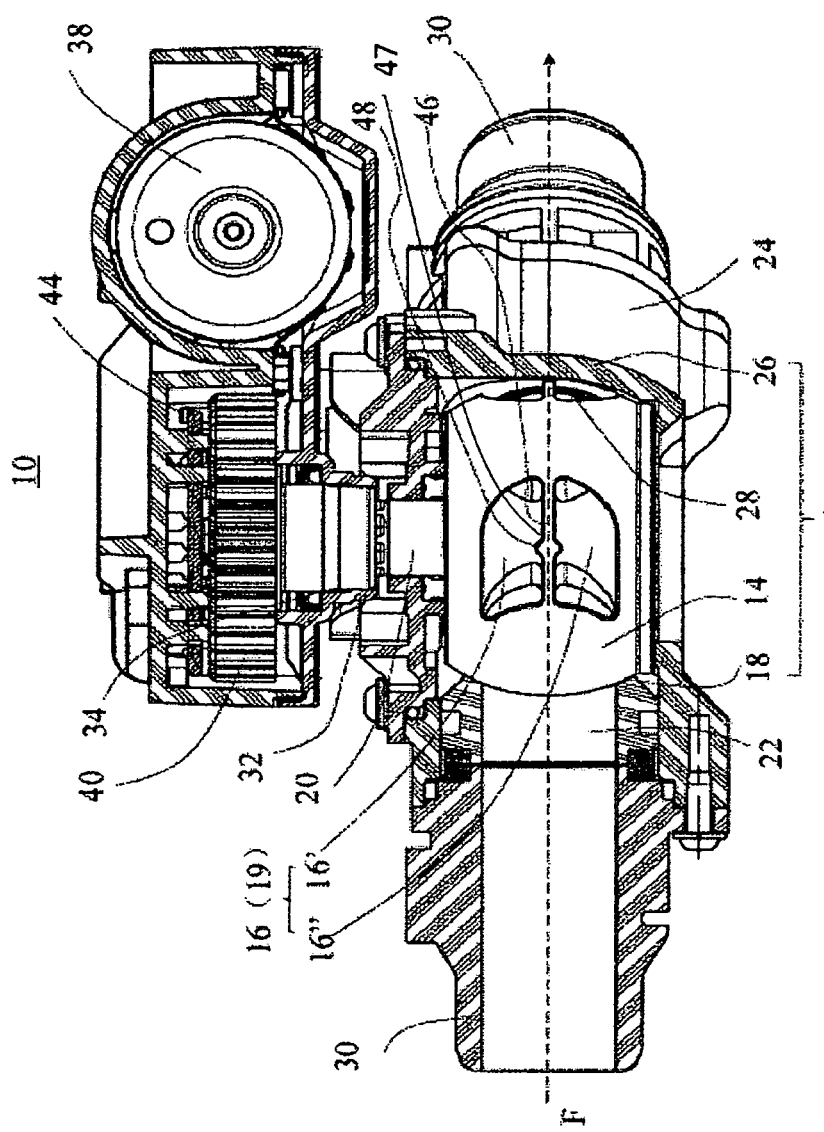
FIG. 1 shows a side representation of a first embodiment of a ball valve apparatus in accordance with the first and second aspects of the invention, the valve housing of the apparatus being illustrated in cross-section to display the valve ball in detail.

Referring to FIG. 1, there is illustrated a two-way ball valve apparatus, indicated globally at 10, and which is able to produce a linear or substantially linear flow rate through the apparatus which is proportional or substantially proportional to an actuation applied.

The ball valve apparatus 10 comprises a ball valve 12 having a valve ball 14, which has two apertures 16 therein forming ball inlet and outlets of the valve ball 14, and a valve housing 18 within which the valve ball 14 is receivable. A void, channel or bore 19 extends through the valve ball 14 to penult fluid passage therethrough. Only one of the apertures 16 is visible in FIG. 1; however, the other aperture will be positioned so as to be 180 degrees around the valve ball 14 to the illustrated aperture 16.

The valve ball 14 is engaged with a valve stem 20 via which the valve ball 14 can be rotated. The valve stem 20 may preferably be integrally formed with the valve ball 14; however, a separately engagable valve stem 20 may be provided.

In the depicted embodiment, the valve ball 14 is formed so as to be substantially spherical, with the apertures 16 being symmetrically formed about an equator of the valve ball 14. The valve ball 14 may be formed from any suitably resilient material which is appropriate for a fluid with which the ball valve apparatus 10 is to be used. For non-corrosive fluids, for instance as part of a nitrogen gas line, the valve ball 14 may be formed from a metal such as stainless steel. However, for more aggressive fluids, a plastic or plastics-coated metal may be preferable. A wide variety of construction materials could be considered for the valve ball 14, as necessity dictates.

The valve housing 18 as illustrated is formed having a housing inlet 22 which is diametrically opposed to a housing outlet 24, and which are positioned either side of a ball seat 26 within the valve housing 18. The ball seat 26 is preferably complementarily-shaped so as to readily receive the valve ball 14, and is therefore formed as a spherical recess in the embodiment of FIG. 1. One or more seals 28 may be provided at or adjacent to the ball seat 26 to prevent or inhibit fluid leakage in use. However, it may be possible to machine the ball seat 26 and valve ball 14 such that the seals 28 are unnecessary, for instance, providing plastics seats directly within the valve housing 18, for example, being formed from polytetrafluoroethylene (PTFE). The seals 28 as illustrated, however, are preferably formed as composite thermosetting plastics friction rings, such as Duroplast, against which the valve ball 14 may abut.

Each of the housing inlet 22 and housing outlet 24 may be connectable to pipes 30 through which a fluid to be transported may flow, the flow being controlled by the ball valve 12. These may be screw-threadably engagable, for instance, with the housing inlet 22 and housing outlet 24, although other means of connection are possible, such as snap-fit or flange and gasket connections. In use, therefore, a fluid flow path, indicated as dashed line F, can be defined through the ball valve apparatus 10, through the housing inlet 22, bore 19 of the valve ball 14, and housing outlet 24, with fluid flow control being provided by the rotation of the ball inlet and outlets 16 in and out of alignment with the housing inlet 22 and housing outlet 24.

The valve housing 18 may be formed as a unitary piece of material which encases the valve ball 14, but may alternatively be provided so as to be openable, to allow the valve ball 14 to be removed for maintenance or replacement. The valve housing 18 may also include a necked portion 32 which extends perpendicularly to the axis of flow through the ball valve apparatus 10, and through which the valve stem 20 may pass. A stem seal 34 may also be provided to limit upward fluid seepage, with a leakage hole 36 being provided in the event that there is a leak of the transported fluid.

The ball valve apparatus 10 may be provided as a manually operable unit, in which case the valve stem 20 may include a user-operable handle to open and close the ball valve 12. However, and as shown in FIG. 1, there may be provided an actuator 38, such as the brushless DC motor illustrated, which is coupled to the valve stem 20 and which is arranged to actuate the valve ball 14. There may be a specific gear train 40 or similar transmission means which is coupled to an output 42 of the actuator 38 and which engages with the valve stem 20 to transmit the necessary torque.

The actuator 38 may be provided as part of the ball valve apparatus 10, being at least partially encased within the valve housing 18, or within its own separate actuator housing. The actuator 38 may be feedback coupled to the valve stem 20, for instance, via a position sensor 44 such as a potentiometer or Hall sensor, so as to ensure that the valve ball 14 is actuated to the correct position, and is not displaced by fluid flow through the ball valve 12.

The valve ball 14 is designed so as to permit optimum or near-optimum linearity between the position of the valve ball 14 and the flow which passes through it. This can be achieved by careful modification of the sectional area of each of the input and output apertures 16 of the valve ball 14.

At least one, and preferably both, of the apertures 16 is shaped so as to be non-circular, the depicted aperture 16 having an approximately D-shaped profile, but an arched, asymmetric or chevron style of aperture could also be conceived. Furthermore, there is provided a, preferably elongate, bridging element 46, which, as shown, may span a horizontal width of the aperture 16 at or adjacent to an equator of the valve ball 14, thereby impeding fluid flow through the centre of the aperture 16. This effectively segments and/or bisects the aperture 16 into upper and lower aperture sections 16', 16".

The bridging element 46 may include an elongate bridge body 47 and one or more baffle elements 48 which, as indicated, may preferably extend laterally of the bridge body 47, for instance, directly vertically, or following the surface curvature of the valve ball 14. Four such baffle elements 48, having a generally triangular shape, are indicated in FIG. 1, and are arranged symmetrically about the bridge body 47. Some of the baffle elements 48 are of differing dimensions, which will be dictated by the changes required to achieve the sectional area of the valve ball 14 required for linear flow. It will be appreciated, however, that no distinct baffle elements 48 must be provided, and a shaped or undulating bridging element 46 could also provide the necessary interruption to fluid flow. The plurality of said baffle elements 48 are provided in a spaced apart relationship along the bridge body 47.

In use, the ball valve 12 will be impassable to fluid flow in the depicted configuration; the apertures 16 are not aligned with the housing inlet 22 and housing outlet 24, and therefore fluid flow path F is impeded by the walls of the valve ball 14. As the actuator 38 is activated, it begins to rotate the valve stem 20, and therefore the valve ball 14 is also rotated. As such, the apertures 16 begin to come into alignment with the respective housing inlet and outlet 22, 24.

In a standard ball valve having a circular bore, the fluid flow would manifest as an initial trickle of fluid flowing through the valve ball as the overlap was very small, followed by a very large increase in the flow rate as the full diameter of the bore overlaps with the inlet or outlet.

The present invention utilises specific shaping of the apertures 16, including the use of bridging elements 46 to improve or inhibit the flow through the valve ball 14 at various points of the rotation of the valve stem 20, such that a linear or substantially linear increase in the flow rate is achieve with the rotation of the valve ball 14. This allows for very precise control over the flow across the fluid flow path F through the ball valve 12.

It will be appreciated that whilst the depicted embodiment of the invention utilises both a shaped aperture 16 and a bridging element 46 having baffle elements 48 attached thereto to regulate the flow, a similar effect could be achieved by emphasising one or other aspect. For instance, a shaped aperture 16 alone could be used, or a circular aperture having a bridging element 46 could also be used in isolation, dependent on requirements.

Whilst a two-way ball valve apparatus 10 can benefit from the flow control provided by the present invention, it will be appreciated that there is a greater degree of turbulence associated with flow splitter devices, in which there may be more than flow stream being merged into a single channel, or a single flow stream being split into multiple individual streams.

Figure 2A:
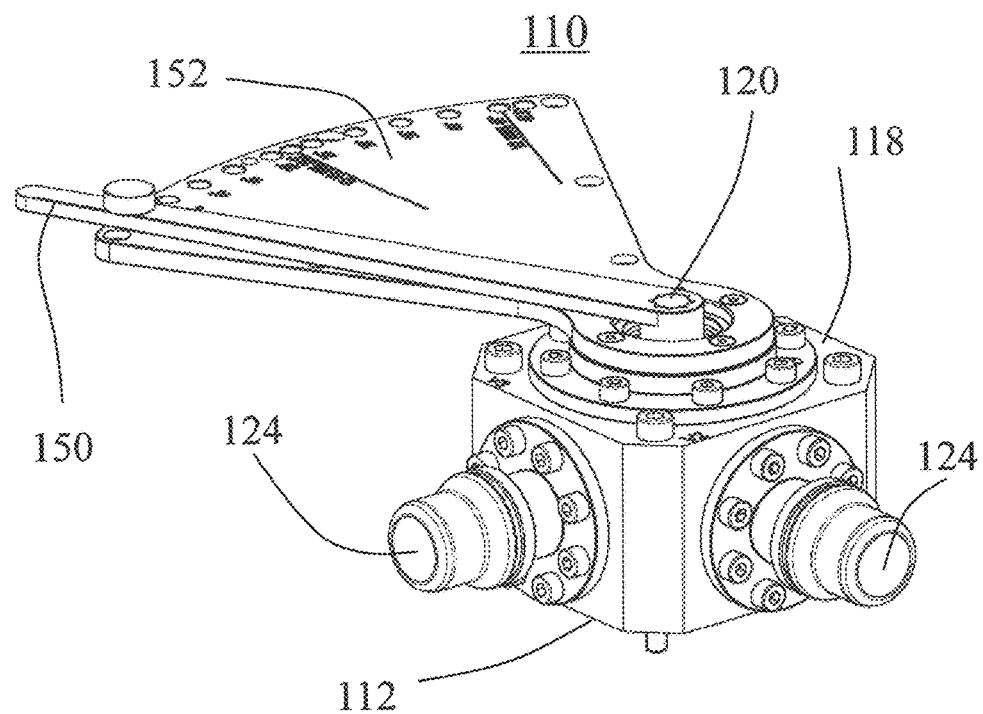
FIG. 2a shows a perspective representation of a second embodiment of a ball valve apparatus in accordance with the first and second aspects of the invention.
Figure 2B:
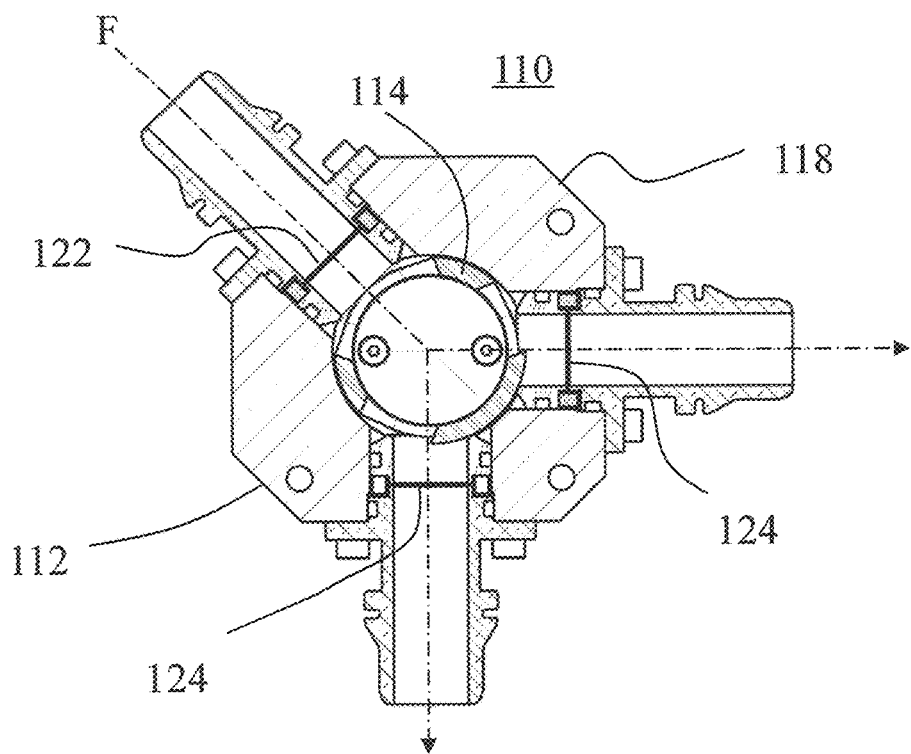

A three-way ball valve apparatus is indicated generally at 110 in FIGS. 2a and 2b. Identical or similar reference numerals are utilised to refer to identical or similar components of the first embodiment of the invention, and further detailed description is therefore omitted.

The three-way ball valve apparatus 110 has, in the depicted embodiment, a substantially cuboidal valve housing 118 which forms the outer portion of the ball valve 112, though other shapes of valve housing will be apparent to the skilled person. There is a single housing inlet 122 positioned on one corner of the valve housing 118, with two housing outlets 124 positioned so as to extend from perpendicular faces of the valve housing 118. Fluid flow can therefore occur through the housing inlet 122 and through either or both housing outlets 124, along fluid flow path F indicated in FIG. 2b. It will be appreciated that the flow direction could be readily changed, and therefore the terms inlet and outlet and accompanying arrows on fluid flow path F are used for indicative purposes only. A three-way ball valve apparatus could just as easily have two inlets and a single outlet.

The valve ball 114 is installed so as to be rotatably operable inside the valve housing 118 at a confluence of the housing inlet 122 and housing outlets 124. The valve stem 120 in the depicted embodiment is connected to a lever 150 extending in a plane perpendicular to the valve stem 120. The lever 150 is associated with an angular guide 152 which is able to inform the user of the expected state of the valve ball 114 once the lever 150 is actuated to a specific angle. This arrangement could, of course, be provided so as to be coupled to an electrically-operable or similar mechanical actuator, so as to provide automatic rather than manual control of the valve ball 114 position.

Figure 3A:
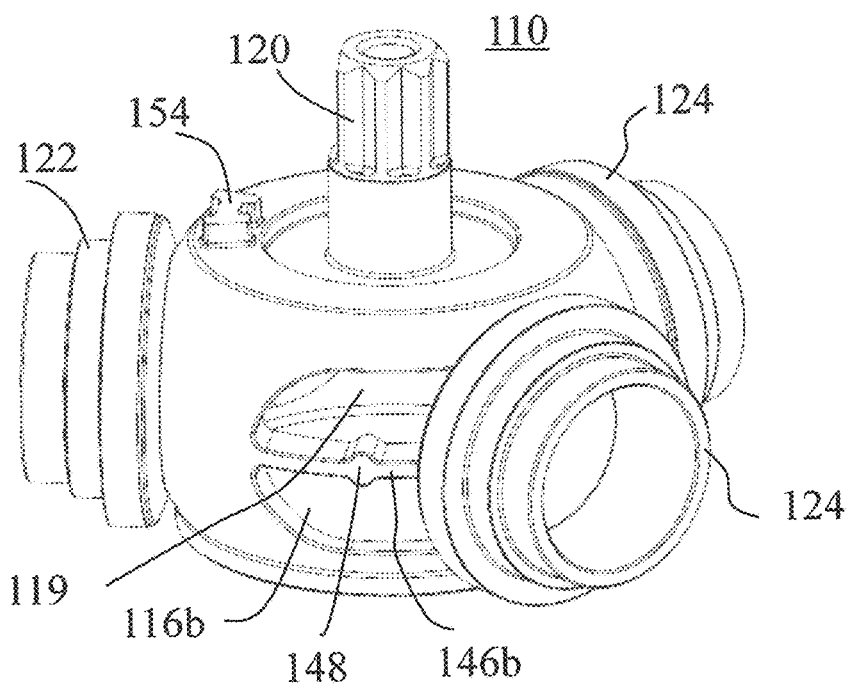
FIG. 3a shows a perspective representation of the valve ball of FIG. 2a with the valve housing having been omitted for clarity.
Figure 3B:
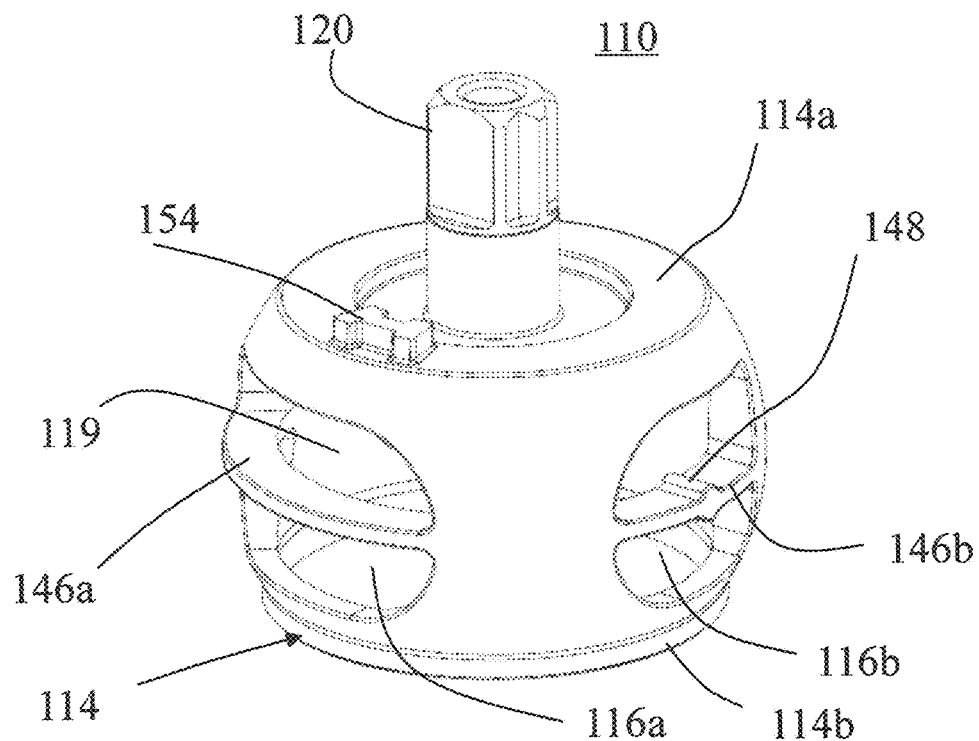
FIG. 3b shows a perspective representation of the valve ball of FIG. 3a following counter-clockwise rotation of the valve ball, and omitting the housing inlet and outlets.

The valve ball 114 is illustrated in more detail in FIGS. 3a and 3b. FIG. 3a also provides an indicative position of the housing inlet and outlets 122, 124 with respect to the valve ball 114.

The valve ball 114 in the present embodiment is formed as a latitude-segmented sphere, therefore forming upper and lower planar surface of the valve ball 114. As illustrated, this may allow a rotational stop 154 to be provided on the valve ball 114 which limits the rotational actuation of the valve ball 114 in use.

In order to provide a three-way ball valve apparatus 110, the valve ball 114 preferably includes three apertures. As illustrated, there is here provided on ball inlet 116a and two ball outlets 116b, respectively corresponding with the housing inlet 122 and the two housing outlets 124, with the ball inlet 116a and ball outlet 116b being connected via bore 119 through the valve ball 114.

The ball inlet 116a is preferably formed such that the fluid flow thereacross is not altered by rotation of the valve ball 114 within the possible range of rotation of the valve stem 120. As such, the ball inlet 116a is formed as a, preferably obrounded, aperture which is larger than either of the ball outlets 116b. There may be provided a bridging element 146a which preferably spans a width of the ball inlet 116a, which may be provided without a baffle element, as shown.

Each of the ball outlets 116b may be preferably formed as non-circular apertures, here formed as substantially D-shaped apertures which are symmetrically arranged about the valve ball 114 with respect to the ball inlet 114. Again, a bridging element 146b may be provided, and here a different, circular, baffle element 148 is depicted, which has a similarly disruptive influence to the fluid flow as per the first embodiment described above. However, such a circular baffle element 148 may be significantly simpler to manufacture accurately than that illustrated in FIG. 1, for instance.

The depicted three-way ball valve apparatus 110 is designed to selectively alter the fluid flow across the fluid flow path F through the valve ball 114. At one extreme, a first ball outlet 116b may be fully open, with the second ball outlet 116b being fully closed. As the valve stem 120 is rotated, the fluid flow through the three-way ball valve apparatus 110 will be split between the two ball outlets 116b in proportion to the cross-sectional area available to fluid flow therethrough. Once the valve stem 120 is fully rotated to a second position, which may be a positional extreme as defined by the stop 154, the second ball outlet 116b will be fully opened, closing off the first ball outlet 116b.

Figure 4:
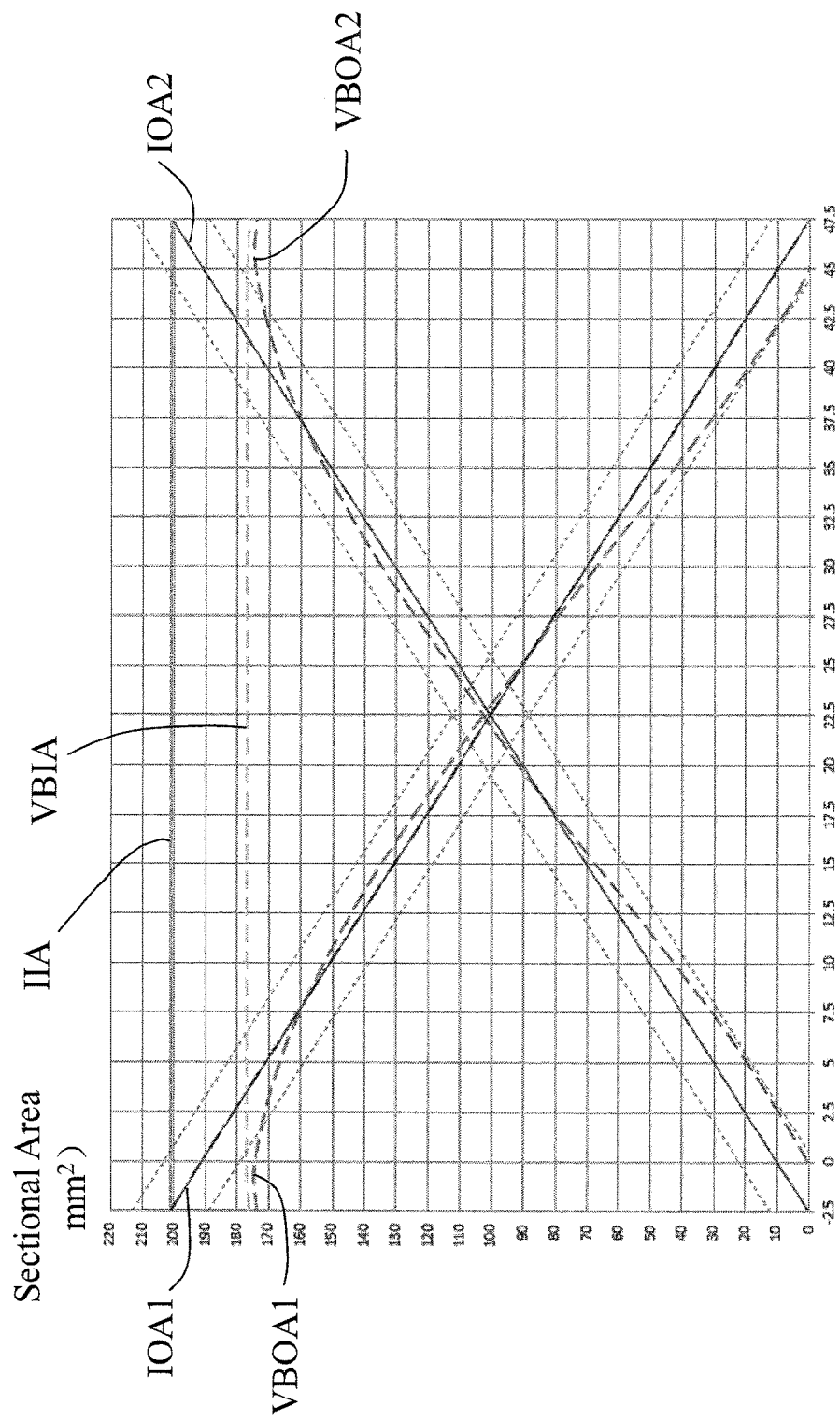
FIG. 4 shows a plot of the calculated sectional areas of the inlet and ball outlets of the ball valve apparatus of FIG. 2a against the angle of rotation of the valve ball, shown in dashed lines, referenced against the ideal linear relationship between the sectional areas and the angle of rotation, shown in unbroken lines.

In an ideal scenario, the ratio between the flows through the two ball outlets 116b will be linearly proportional to the degree of rotation of the valve ball 114. This can be achieved by attempting to provide a proportional relationship between the sectional area of each ball outlet 116b and the angular position of the valve ball 114. This ideal relationship is illustrated by the solid lines in FIG. 4, the graph being globally indicated at 200: the line IIA represents the ideal inlet area as a function of angular displacement of an ideal valve ball 114; the line IOA1 represents the ideal outlet area of a first ball outlet; and the line IOA2 represents the ideal outlet area of a second ball outlet. The dotted lines surrounded lines IOA1 and IOA2 represent a deviation of ±6% from the ideal lines.

For the valve ball 114 of FIGS. 3a and 3b, the calculated relationship between the sectional area of each aperture 116a, 116b is illustrated as a function of the angular displacement of the valve ball 114: line VBIA shows the valve ball inlet area, which is constant as a function of time, and reduced with respect to the ideal scenario IIA due to the presence of the bridging element; line VBOA1 shows the first valve ball outlet area; and line VBOA2 shows the second valve ball outlet area.

As can be seen, for the majority of the rotation of the valve ball 114, the sectional area of each of the ball outlets 116b is within ±6% deviation from the ideal case, with a slightly greater deviation from the ideal as the first or second ball outlets 116b first open.

As a result of this near-linear relationship between angular position of the valve ball 114 and the fluid flow rate through the three-way ball valve apparatus 110, it is possible to very accurately control the rate of flow through a fluid flow system without needing to resort to costly monitoring devices. Instead, the valve ball 114 can be accurately actuated, and the fluid flow inferred from the angle of the valve ball 114.

It will be apparent that although two-way and three-way ball valve apparatuses 10, 110 are discussed above, that other flow control valve mechanisms are available having different numbers of inlet and outlets, and the present invention is therefore not intended to be restrictive to the embodiments shown.

Furthermore, whilst the bridging elements as described are physically attached, either via integral forming or mechanical engagement, to the valve ball so as to span the apertures thereof, it will be appreciated that a similar interruption of the flow could be achieve by providing a separate bridging element which is insertable into the flow path of the apertures. In this latter case, the insert may be fashioned to complementarily match or substantially match the bore of the valve ball, for example as a tight push-fit or interference fit, with an interior surface of the insert thus being any required circular or non-circular shape to define a flow path along with a required bridging element. Furthermore, although the bridging element described above preferably fully spans a bore of the valve ball, preferably along the diameter, the bridging element may be cantilevered to extend from one side only, or may be connected to the bore wall at one, two or more locations. Additionally or alternatively, although the bridging element is preferably at the ball inlet and ball outlet, the bridging element may be set back from one or both openings and thus recessed into the bore of the valve ball, or be incorporated as part of the valve housing, instead of being part of the valve ball.

It is therefore possible to provide a ball valve apparatus having an improved linearity of fluid flow therethrough, but altering the apertures of the valve ball so as to change the proportionality of flow therethrough to be linearly proportional to the angle of rotation of the valve ball. This can be achieved by, for instance, shaping the outer dimensions of the apertures, or by providing a bridging element which at least in part blocks a fluid flow through a centre of the apertures.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A ball valve apparatus having an improved linearity of fluid flow therethrough, the ball valve apparatus comprising:
   a valve housing including a housing inlet and a housing outlet;
   a valve ball, receivable within the valve housing, the valve ball having a bore therethrough;
   a ball inlet and ball outlet of the valve ball which are in fluid communication with the bore, a fluid flow path through the ball valve apparatus being defined at least in part by the housing inlet, housing outlet, ball inlet, ball outlet and the bore;
   a valve stein engagable with the valve ball; and
   the valve ball being rotatable relative to the valve housing via the valve stem such that as the ball inlet and housing inlet, and ball outlet and housing outlet are brought in and out of alignment and a flow rate along the fluid flow path changing linearly or substantially linearly with a degree of rotation of the valve ball;
   wherein at least one bridging element is positioned on the fluid flow path to alter a fluid flow thereacross, the or each bridging element comprises an elongate bridge body and a baffle element which extends laterally of the bridge body within the ball inlet and/or ball outlet.

2. The ball valve apparatus as claimed in claim 1, wherein the at least one bridging element is associated with the ball inlet and/or ball outlet.

3. The ball valve apparatus as claimed in claim 1, wherein one said bridging element is provided associated with each of the ball inlet and ball outlets of the valve ball.

4. The ball valve apparatus as claimed in claim 1, wherein the or each bridging element spans a width of the ball inlet and/or ball outlet so as to segment the ball inlet and/or ball outlet.

5. The ball valve apparatus as claimed in claim 4, wherein the or each bridging element is aligned in a plane which is perpendicular to an axis of rotation of the valve ball.

6. The ball valve apparatus as claimed in claim 1, wherein the baffle element is symmetric about the bridge body.

7. The ball valve apparatus as claimed in claim 1, wherein a plurality of said baffle elements are provided in a spaced apart relationship along the bridge body.

8. The ball valve apparatus as claimed in claim 1, wherein at least one of the ball inlet and ball outlet has a non-circular profile.

9. The ball valve apparatus as claimed in claim 8, wherein at least one of the ball inlet and ball outlet has a substantially asymmetric, arched, chevron or D-shaped profile.

10. The ball valve apparatus as claimed in claim 8, wherein the ball inlet and ball outlet are shaped differently to one another.

11. The ball valve apparatus as claimed in claim 1, further comprising a valve actuator engagable with the valve ball to effect the rotation of the valve ball.

12. The ball valve apparatus as claimed in claim 1, wherein the valve ball includes two said ball inlets and one said ball outlets, and the valve housing respectively includes two said housing inlets and one said housing outlets, the flow rate via the one said housing outlets is almost unchanged with the rotation of the valve ball, but the flow rate via one of the two housing inlets increases linearly with a degree of rotation of the valve ball and the flow rate via the other one of the two housing inlets decreases linearly with a degree of rotation of the valve ball.

13. The ball valve apparatus as claimed in claim 1, wherein the valve ball includes one said ball inlets and two said ball outlets, and the valve housing respectively includes one said housing inlets and two said housing outlets, the flow rate via the one said housing inlets is almost unchanged with the rotation of the valve ball, but the flow rate via one of the two housing outlets increases linearly with a degree of rotation of the valve ball and the flow rate via the other one of the two housing outlets decreases linearly with a degree of rotation of the valve bal.

14. A method of improving the linearity of fluid flow through a ball valve apparatus, the method comprising the steps of: a] providing a ball valve apparatus as claimed in claim 1; and b] rotating the valve ball to increase a fluid flow across the fluid flow path, such that the fluid flow is linearly or substantially linearly proportional to the degree of rotation of the valve ball.

* * * * *